United States Patent
Mochizuki et al.

(10) Patent No.: US 11,731,554 B2
(45) Date of Patent: Aug. 22, 2023

(54) VEHICLE DEPARTURE NOTIFICATION DISPLAY DEVICE

(71) Applicant: KOITO MANUFACTURING CO., LTD., Tokyo (JP)

(72) Inventors: Kiyotaka Mochizuki, Shizuoka (JP); Naoki Tatara, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 222 days.

(21) Appl. No.: 17/281,103

(22) PCT Filed: Sep. 26, 2019

(86) PCT No.: PCT/JP2019/037897
§ 371 (c)(1),
(2) Date: Mar. 29, 2021

(87) PCT Pub. No.: WO2020/067305
PCT Pub. Date: Apr. 2, 2020

(65) Prior Publication Data
US 2022/0219599 A1    Jul. 14, 2022

(30) Foreign Application Priority Data

Sep. 28, 2018  (JP) ................................. 2018-184491
Sep. 12, 2019  (JP) ................................. 2019-166526

(51) Int. Cl.
*B60Q 1/34*    (2006.01)
*B60Q 1/50*    (2006.01)

(52) U.S. Cl.
CPC .............. *B60Q 1/346* (2013.01); *B60Q 1/50* (2013.01); *B60Q 2400/50* (2013.01)

(58) Field of Classification Search
CPC ...... B60Q 1/346; B60Q 1/50; B60Q 2400/50; B60Q 1/507
See application file for complete search history.

(56) References Cited

U.S. PATENT DOCUMENTS

2009/0091474 A1* 4/2009 Konforty ............... G08G 1/095
340/907
2012/0300078 A1* 11/2012 Ogata .................... G06V 10/50
348/148

(Continued)

FOREIGN PATENT DOCUMENTS

JP    2004306894 A    11/2004
JP    2010018243 A    1/2010

(Continued)

OTHER PUBLICATIONS

International Search Report issued in corresponding International Application No. PCT/JP2019/037897; dated Nov. 19, 2019 (5 pages).

(Continued)

*Primary Examiner* — Omeed Alizada
(74) *Attorney, Agent, or Firm* — Osha Bergman Watanabe & Burton LLP

(57) ABSTRACT

A vehicle departure notification display device includes a road surface rendering unit which uses light to render a departure notification display having a prescribed shape on a road surface in the direction of travel of a vehicle, and a control unit which determines whether the departure notification display is required when the vehicle departs, controls the road surface rendering unit to render the departure notification display when determined to be required, and again controls the road surface rendering unit to stop the rendered departure notification display upon determining that notification of the departure notification display is to stop, wherein the control unit causes the road surface (Continued)

rendering unit to render the departure notification display upon detecting information indicating that a brake with which the vehicle is provided has switched from ON to OFF, serving as a determination that the departure notification display is required.

15 Claims, 11 Drawing Sheets

(56) References Cited

U.S. PATENT DOCUMENTS

2017/0203685 A1* 7/2017 Hirai .................. B60Q 1/50
2020/0070716 A1 3/2020 Sakata et al.

FOREIGN PATENT DOCUMENTS

| JP | 2012-247369 A | 12/2012 |
| JP | 2016101797 A | 6/2016 |
| WO | 2018-138842 A1 | 8/2018 |

OTHER PUBLICATIONS

Written Opinion of the International Searching Authority issued in corresponding International Application No. PCT/JP2019/037897; dated Nov. 19, 2019 (7 pages).
Extened European Search Report issued in corresponding European Application No. 19864850.3, dated Oct. 21, 2021 (8 pages).

* cited by examiner

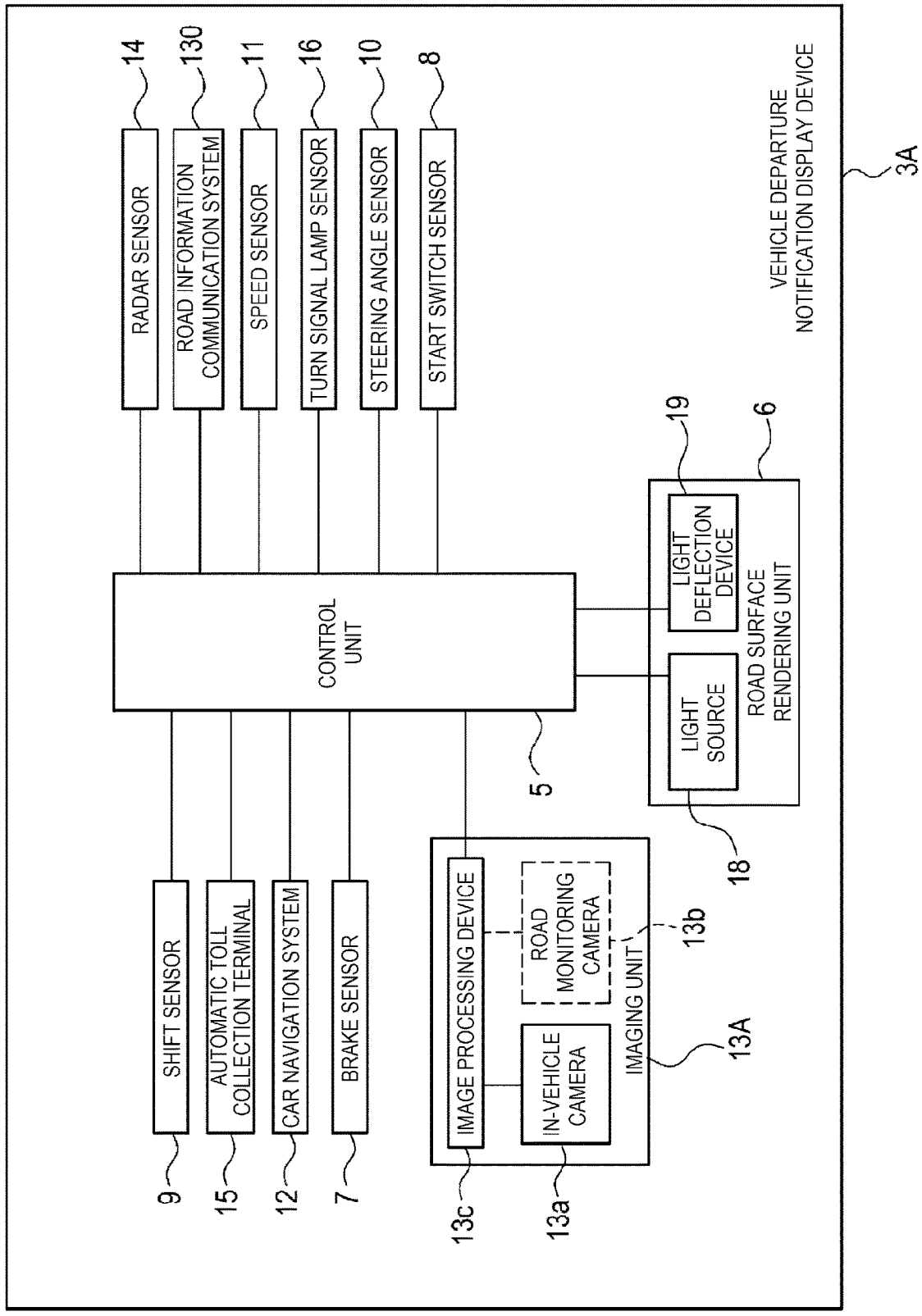

VEHICLE DEPARTURE NOTIFICATION DISPLAY DEVICE

TECHNICAL FIELD

The present invention relates to a departure notification display device that notifies a pedestrian or the like of departure of a vehicle.

BACKGROUND ART

Patent Literature 1 discloses a vehicle departure safety control device that notifies a pedestrian or the like of departure of a vehicle by projecting laser light of a predetermined pattern onto a road surface accompanying with departure of a parked vehicle.

Patent Literature 1: JP 2016-101797 A

SUMMARY OF INVENTION

The vehicle departure safety control device disclosed in Patent Literature 1 renders a predetermined departure notification pattern onto a road surface to notify a pedestrian or the like of departure of a vehicle in parking, that is, in a state in which a speed is zero. Therefore, the departure notification pattern is continuously displayed on the road surface even when the parked vehicle does not depart immediately after the departure notification pattern is displayed. Therefore, a pedestrian, another traveling vehicle, or the like (hereinafter, simply referred to as a pedestrian or the like) that sees the departure notification pattern may not be able to accurately know departure timing of the vehicle.

An object of the present disclosure is to provide a vehicle departure notification display device having an effect that a pedestrian or the like who sees a departure notification display rendered onto a road surface from a vehicle can accurately know departure timing of the vehicle.

In order to achieve the object described above, according to an aspect of the present disclosure, there is provided a vehicle departure notification display device. The vehicle departure notification display device includes a road surface rendering unit mounted on a vehicle and configured to render a departure notification display having a predetermined shape onto a road surface in a traveling direction of the vehicle by light, and a control unit configured to determine whether a departure notification display is necessary in departure of the vehicle and configured to control the road surface rendering unit to render a departure notification display in a necessity determination and control the road surface rendering unit again to stop a departure notification display in a notification stop determination for the rendered departure notification display. The control unit regards detection of switching information indicating that a brake of the vehicle is switched from ON to OFF as the necessity determination for the departure notification display and controls the road surface rendering unit to render a departure notification display.

According to the above configuration, the control unit controls the road surface rendering unit to render a vehicle departure notification display onto the road surface accompanying with releasing of the brake right before departure of the vehicle, and controls the road surface rendering unit to stop rendering the departure notification display according to a rendering stop determination.

In the vehicle departure notification display device according to another aspect of the present disclosure, the control unit may regard the detection of the switching information indicating that the brake is switched from ON to OFF after detection of switching information indicating that the start switch of the vehicle is switched from OFF to ON as the necessity determination and controls the road surface rendering unit to render a departure notification display.

According to the above configuration, the road surface rendering unit renders a vehicle departure notification display of a parked vehicle onto the road surface based on information indicating that the start switch is turned on when the vehicle departs from a parked state and switching information indicating that the brake is switched from a braking state to a releasing state after the start switch is turned on.

In the vehicle departure notification display device according to still another aspect of the present disclosure, the control unit may be configured to control the road surface rendering unit to render the departure notification display in a front direction of the vehicle when information related to a forward movement of the vehicle is detected and control the road surface rendering unit to render the departure notification display in a rear direction of the vehicle when information related to a reverse movement of the vehicle is detected.

According to the above configuration, the road surface rendering unit renders a departure notification display in a front direction of the vehicle when the information related to a forward movement of the vehicle (a shift lever is at a drive "D" position) is detected. The road surface rendering unit renders a departure notification display in a rear direction of the vehicle when the information related to a reverse movement of the vehicle (the shift lever is at a reverse "R" position) is detected.

In the vehicle departure notification display device according to still another aspect of the present disclosure, the control unit may be configured to control the road surface rendering unit to render a departure notification display in a right direction of the vehicle when information related to a right steering of the vehicle is detected and control the road surface rendering unit to render a departure notification display in a left direction of the vehicle when information related to a left steering of the vehicle is detected.

According to the above configuration, the road surface rendering unit renders a departure notification display in a right direction of the vehicle when information related to a right steering of the vehicle is detected. The road surface rendering unit renders a departure notification display in a left direction of the vehicle when information related to a left steering of the vehicle is detected.

In the vehicle departure notification display device according to still another aspect of the present disclosure, the control unit may regard detection of information related to a temporary stop of the vehicle and detection of switching information indicating that the brake is switched from ON to OFF is detected after a period of non-notification determination from the detection of the information related to the temporary stop as the necessity determination for a departure notification display and control the road surface rendering unit to render a departure notification display.

According to the above configuration, when switching information indicating that the brake is switched from a braking state to a releasing state is detected after a period of non-notification determination since information related to a temporary stop of the vehicle is detected, the road surface rendering unit renders a vehicle departure notification display onto a road surface.

In the vehicle departure notification display device according to still another aspect of the present disclosure, the control unit may regard the detection of the switching information indicating that the brake is switched from ON to OFF after detection of a necessary target detected by a detection unit configured to detect the necessary target for a departure notification display as the necessity determination for a departure notification display and control the road surface rendering unit to render a departure notification display.

According to the above configuration, when switching information indicating that the brake is switched from a braking state to a releasing state is detected after a necessary target for a departure notification display is detected, the road surface rendering unit renders a vehicle departure notification display onto a road surface.

In the vehicle departure notification display device according to still another aspect of the present disclosure, the necessary target detection unit may be a car navigation system, and the necessary target may be detected based on road information obtained by the car navigation system.

In the vehicle departure notification display device according to still another aspect of the present disclosure, the necessary target detection unit may be an imaging unit that images surroundings of the vehicle, and the necessary target may be detected based on an image captured by the imaging unit.

In the vehicle departure notification display device according to still another aspect of the present disclosure, the control unit may regard the detection of the switching information indicating that the brake is switched from ON to OFF after detection of an unnecessary target detected by an unnecessary target detection unit configured to detect an unnecessary target for a departure notification display as an unnecessary determination for a departure notification display and control the road surface rendering unit not to render a departure notification display.

According to the above configuration, when the brake is switched from a braking state to a releasing state after an unnecessary target for a departure notification display is detected, the road surface rendering unit does not render a vehicle departure notification display onto a road surface.

In the vehicle departure notification display device according to still another aspect of the present disclosure, the unnecessary target detection unit may be a car navigation system, and the unnecessary target may be detected based on road information obtained by the car navigation system.

In the vehicle departure notification display device according to still another aspect of the present disclosure, the unnecessary target detection unit may be an imaging unit that images surroundings of the vehicle, and the unnecessary target may be detected based on an image captured by the imaging unit.

In the vehicle departure notification display device according to still another aspect of the present disclosure, the unnecessary target detection unit may be a stop signal detection unit that detects a stop signal of the vehicle as the unnecessary target.

In the vehicle departure notification display device according to still another aspect of the present disclosure, the unnecessary target detection unit may be a preceding vehicle detection unit that detects a preceding vehicle of the vehicle as the unnecessary target.

In the vehicle departure notification display device according to still another aspect of the present disclosure, the unnecessary target detection unit may be an automatic toll collection device detection unit that detects a fact that the vehicle passes through an automatic toll collection device as the unnecessary target.

In the vehicle departure notification display device according to still another aspect of the present disclosure, the unnecessary target detection unit may be a turn signal lamp detection unit that detects ON and OFF of a turn signal lamp of the vehicle as the unnecessary target.

According to the vehicle departure notification display device described above, since the departure notification display is displayed only immediately before the departure of the vehicle, a pedestrian or the like who sees the departure notification display can accurately know departure timing of a vehicle.

BRIEF DESCRIPTION OF DRAWINGS

FIG. 9 is a block diagram showing a departure notification display device according to a modification.

DESCRIPTION OF EMBODIMENTS

Figure 1:
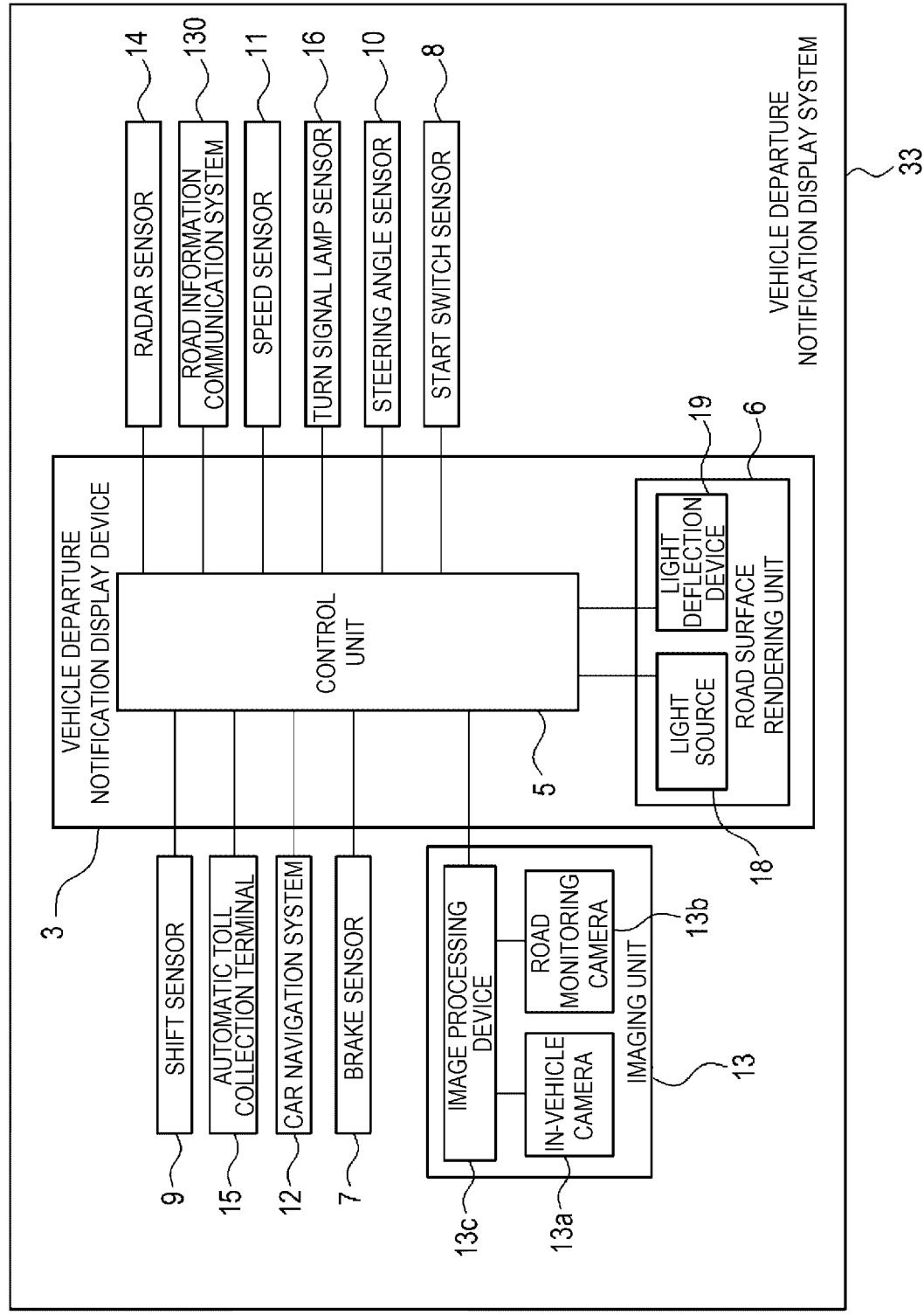
FIG. 1 is a block diagram showing a vehicle departure notification display system according to an embodiment of the present disclosure.

Hereinafter, preferred embodiments of the present disclosure will be described with reference to the accompanying drawings. Directions shown in the drawings (upper: Up, lower: Lo, left: Le, Right: Ri, front: Fr, rear: Re) are directions viewing from a driver of a vehicle equipped with a departure notification display device or a part of a vehicle lamp including the departure notification display device. The directions are directions displayed for the convenience of description, and the present disclosure is not intended to be limited to the shown directions.

Figure 2:
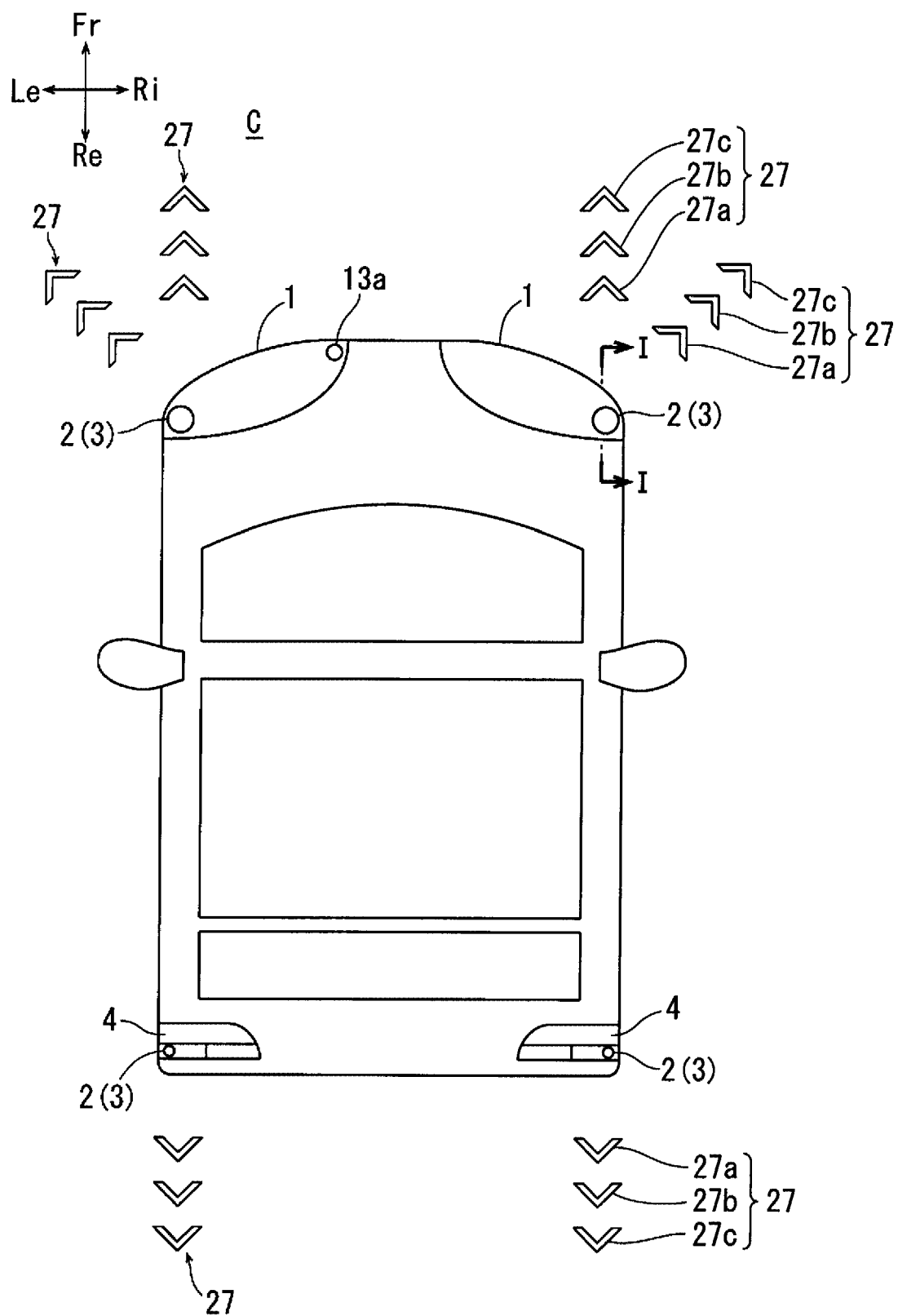
FIG. 2 is a plan view showing a vehicle equipped with a departure notification display device.

A pair of left and right vehicle head lamps 1 of a vehicle C shown in FIG. 2 is equipped with departure notification lamps 2 each including a departure notification display device 3 (see FIG. 1) to be described later so as to emit light onto a road surface ahead of the vehicle. A pair of left and right rear combination lamps 4 corresponding to the vehicle head lamps 1 are also equipped with a pair of left and right departure notification lamps 2 each including the departure notification display device 3 so as to emit light onto a road surface at a rear side of the vehicle. Alternatively, the departure notification lamp 2 may be mounted on only one of the left and right vehicle head lamps 1 (or the rear combination lamps). Alternatively, the vehicle C may be equipped with one departure notification lamp including a vehicle front side departure notification display device and one departure notification lamp including a vehicle rear side departure notification display device at any position such as a central portion outside a vehicle body. Alternatively, the vehicle C may not include the vehicle rear side departure notification display device 3.

A vehicle departure notification display system 33 shown in FIG. 1 is a system used for a vehicle equipped with an autonomous driving device or the like. The vehicle departure notification display system 33 includes the departure notification display device 3, a brake sensor 7, a start switch sensor 8, a shift sensor 9, a steering angle sensor 10, a speed sensor 11, a car navigation system 12, an imaging unit 13, a radar sensor 14, an automatic toll collection terminal 15, a turn signal lamp sensor 16, and a road information communication system 130. The departure notification display system 33 is mounted on the vehicle C excluding a road monitoring camera 13b of the imaging unit 13 to be described later. The departure notification display device 3 includes a control unit 5 and a road surface rendering unit 6.

The control unit 5 is implemented by an arithmetic control unit such as a CPU. The control unit 5 determines whether a departure notification display is necessary during departure of the vehicle C based on various kinds of information detected by the brake sensor 7, the start switch sensor 8, the shift sensor 9, the steering angle sensor 10, the speed sensor 11, the car navigation system 12, the imaging unit 13, the road information communication system 130, the radar sensor 14, the automatic toll collection terminal 15, and the turn signal lamp sensor 16. The various kinds of information will be described later. When the control unit 5 determines that a departure notification display is necessary during departure of the vehicle C, the control unit 5 controls the road surface rendering unit 6 to render a departure notification display. On the other hand, when the control unit 5 determines that the departure notification display is unnecessary during departure of the vehicle C, the control unit 5 controls the road surface rendering unit 6 not to render a departure notification display. Further, the control unit 5 controls the road surface rendering unit 6 again to stop a departure notification display in a notification stop determination for determining a notification stop condition for the rendered departure notification display.

Figure 3:
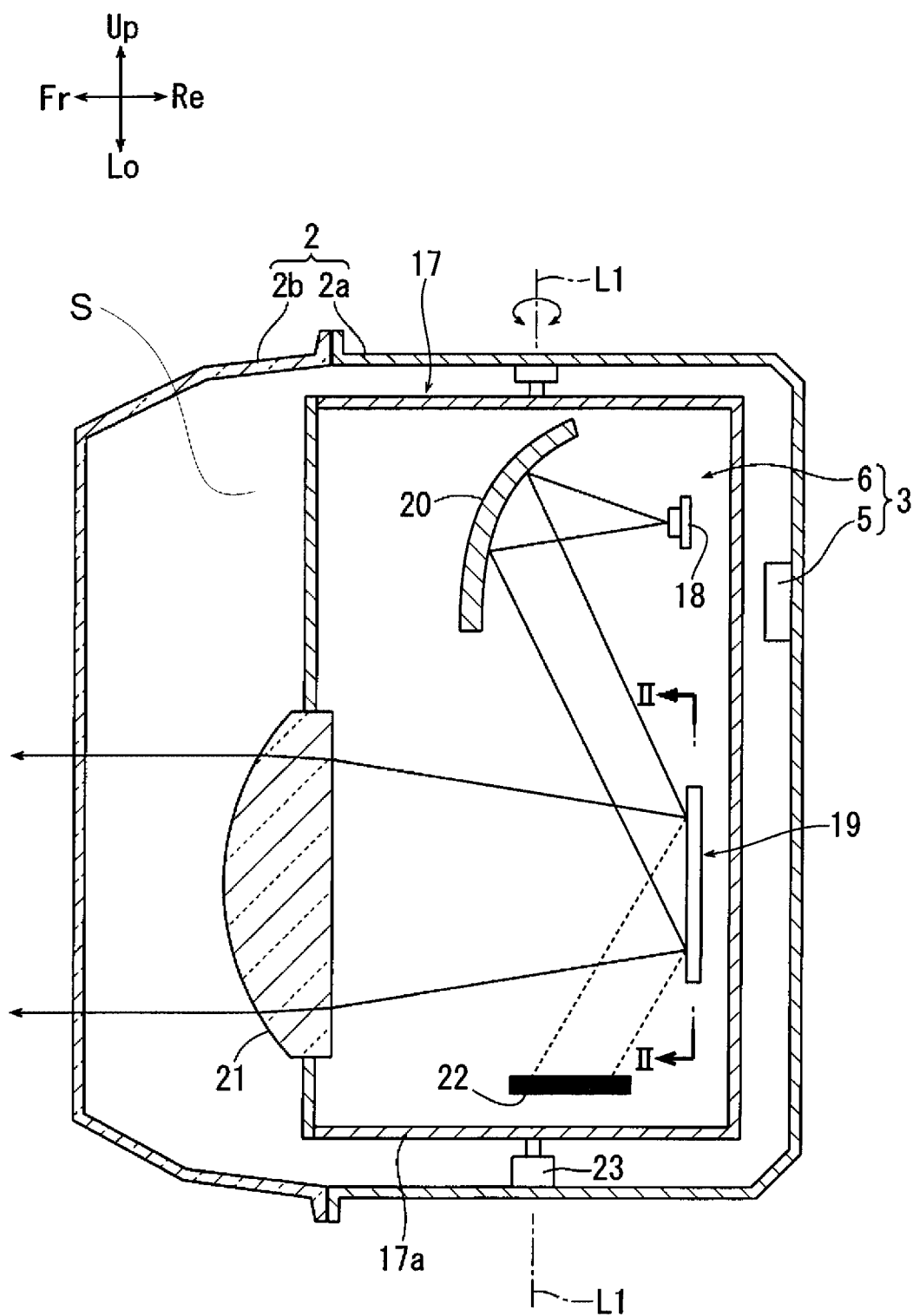
FIG. 3 is a cross sectional view taken along a line I-I in FIG. 2 and showing a vehicle lamp including the departure notification display device.

The road surface rendering unit 6 will be described with reference to FIGS. 1 and 3. As shown in FIG. 1, the road surface rendering unit 6 includes a light source 18 and a light deflection device 19. The road surface rendering unit 6 constitutes a part of a road surface rendering unit 17 (see FIG. 3). As shown in FIG. 3, the road surface rendering unit 17 includes a unit body 17a, the light source 18, the light deflection device 19, a reflective optical member 20 such as a reflector, a projection optical member 21 such as a plano-convex lens, and a light absorption member 22. The road surface rendering unit 17 further includes the departure notification lamp 2 disposed in a housing S that is internally formed with a lamp body 2a having an opening at a front side of the vehicle and a transparent or translucent front cover 2b that closes the opening. The road surface rendering unit 17 is held in a manner in which the road surface rendering unit 17 can horizontally rotate inside the lamp body 2a, and is configured to swing around a central axis L1 by a motor 23 or the like. The road surface rendering unit 17 tilts to the left or the right under the control of the control unit 5 in FIG. 1, and switches an emission direction of a road surface rendering display onto a road surface to a front side or an obliquely front side of the vehicle C (for the road surface rendering unit 17 of the rear combination lamp 4, switch to a rear side or an obliquely rear side of the vehicle C).

Examples of the light source 18 include a semiconductor light emitting element such as a light emitting diode (LED), a laser diode (LD), and an electro luminescence (EL) element, a lamp bulb, an incandescent lamp (halogen lamp), and discharge (discharge lamp). For example, the light source 18 may emit white light, yellow light, or the like to a front side, and emit red light or the like to a rear side.

The reflective optical member 20 reflects light emitted from the light source 18 toward the light deflection device 19. The light deflection device 19 is disposed on an optical axis of the projection optical member 21. The light deflection device 19 selectively reflects the reflected light from the reflective optical member 20 to the projection optical member 21, and emits the reflected light to the outside of the departure notification lamp 2. Light emitted from the departure notification lamp 2 of the vehicle head lamp 1 is used to display a vehicle departure notification display to be described later in a range from a front side to an obliquely front side of the vehicle C based on a horizontal swing of the road surface rendering unit 17. Light emitted from the departure notification lamp 2 of the rear combination lamp 4 is used to display a vehicle departure notification display to be described later in a range from a rear side to an obliquely rear side of the vehicle C based on a horizontal swing of the road surface rendering unit 17.

Figure 4A:
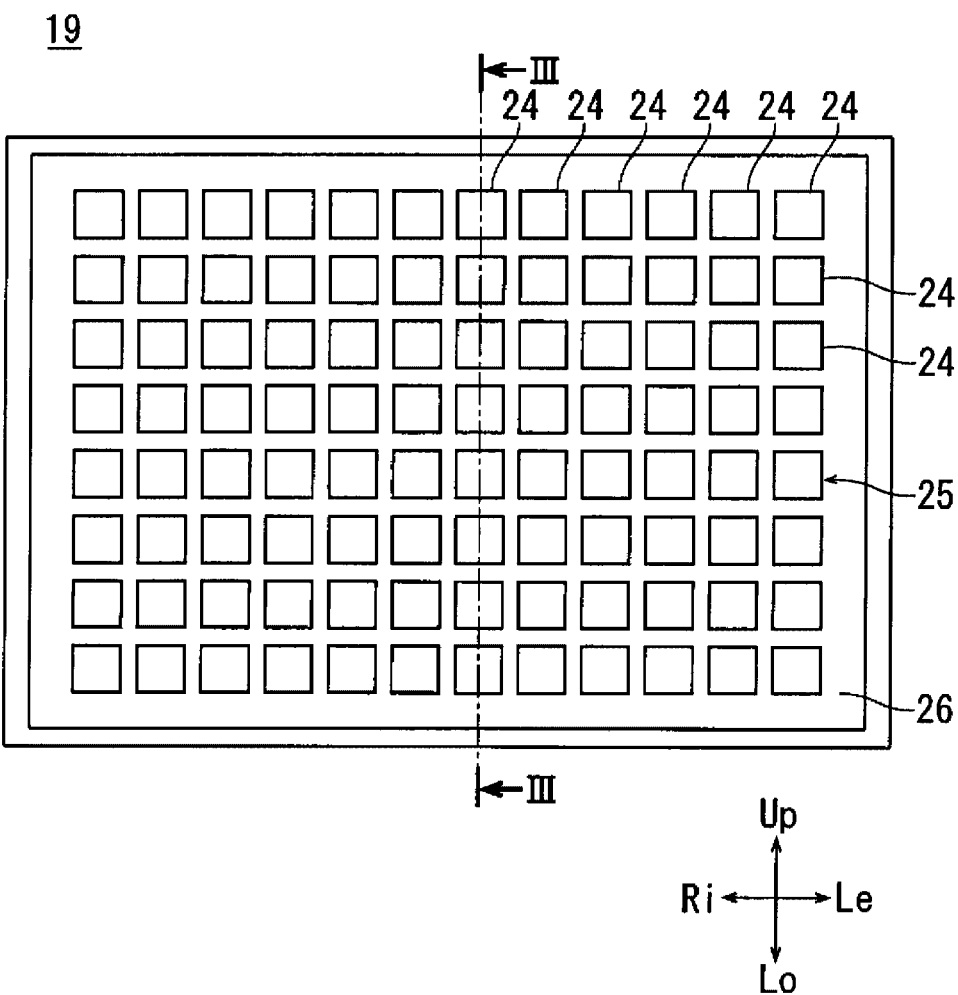
FIG. 4A is a cross sectional view taken along a line II-II in FIG. 3 and showing a light deflection device of a road surface rendering unit.

A digital mirror device (DMD) that is a micro-mirror device can be used as the light deflection device 19 according to the present embodiment shown in FIGS. 1, 3, 4A, and 4B. As shown in FIG. 4A, the light deflection device 19 includes a micro-mirror array 25 in which a plurality of minute mirror elements 24 each having a reflective surface 24a on a surface of the mirror element 24 are arranged in a matrix. The light deflection device 19 includes a transparent cover member 26 disposed at a light emitting side of the reflective surface 24a of each of the mirror elements 24.

Each of the mirror elements 24 in the micro-mirror array 25 can be switched between an ON state (a solid line position shown in FIG. 4B) in which light emitted from the light source 18 is emitted toward the projection optical member 21 so that the light can be used as a desired light distribution pattern and an OFF state (a broken line position shown in FIG. 4B) in which light emitted from the light source 18 is reflected by the light absorption member 22 so that the light cannot be effectively used. Specifically, each of the mirror elements 24 can be switched between the ON state and the OFF state around a rotation axis. Each mirror element 24 emits a part of the emitted light to the projection optical member 21, and reflects the other emitted light to the light absorption member 22, so that the other emitted light cannot be effectively used. The micro-mirror array 25 can obtain a light distribution pattern or the like corresponding to a desired projection image by independently controlling the ON and OFF states of the plurality of mirror elements 24 arranged in a matrix.

Figure 4B:
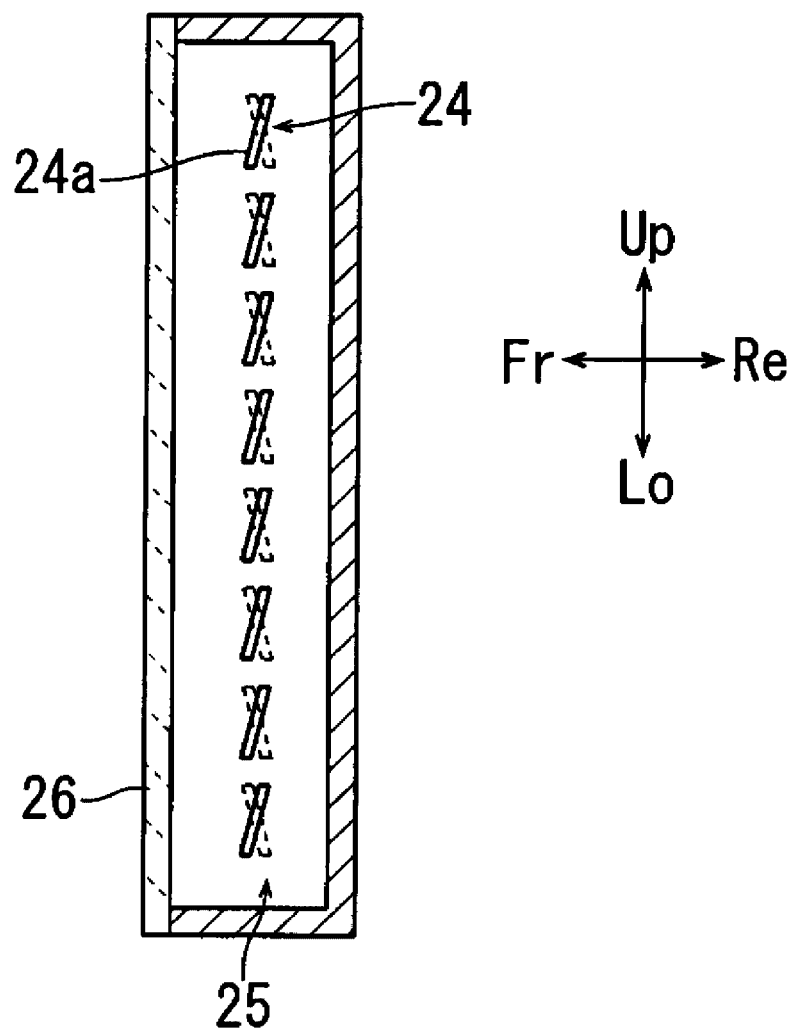
FIG. 4B is a cross sectional view taken along a line in FIG. 4A and showing the light deflection device of the road surface rendering unit.

The micro-mirror array 25 shown in FIGS. 4A and 4B represents brightness and darkness of light in a stepwise manner and represents reflective light of white light in monochrome by adjusting an ON time ratio when switching the ON and OFF states of each mirror element 24 at a high speed. When reflective light from each mirror element 24 is represented to light of a desired color, light source units of three or more colors such as red, green, and blue in the light source 18 are used to emit light to the light deflection device 19 in a time division manner, and the ON and OFF states of the mirror element are switched in a division of thousands times per second, so that a person seeing the reflective light recognizes the reflective light as mixed light due to an illusion (afterimage effect) of human eyes. As a result, the minute mirror elements 24 can represent various colors having predetermined brightness and darkness. Then, the light deflection device 19 can render a mark of a desired form, that is, a departure notification display onto a road surface by a set of light spots. The set of light spots has a predetermined brightness and color and is emitted in a matrix by the plurality of mirror elements 24 that are independently controlled.

Instead of the DMD, the light deflection device 19 may adopt a scanning mechanism for reflecting light from a light source by a reflector that is swingable in a two-dimensional direction at high speed and scans a road surface with the reflected light in a two-dimensional direction at high speed to render a mark of a desired form onto the road surface. Alternatively, the light deflection device 19 may widely adopt a rotary scanner, a Galvano scanner, a resonant scanner, an optical micro electro mechanical systems (MEMS) scanner, a polygon mirror, and the like. Alternatively, the road surface rendering unit 6 may be configured to render only one type of departure notification display onto a road surface when light passes through a predetermined optical member.

The departure notification lamp 2 including the road surface rendering unit 6 according to the present embodiment arranges departure notification displays 27 each including a plurality of boomerang marks 27*a* to 27*c* so as to render a departure notification display. A corner of each of the marks 27*a* to 27*c* is oriented in a traveling direction of the vehicle as shown in FIG. 2. The number of the plurality of marks is not limited to three as long as a plurality of marks are rendered, and a shape of each mark is not limited to a boomerang. It is desirable that the departure notification display 27 is rendered in order from a mark close to the vehicle in which the mark 27*a* is turned on or turned off, then the mark 27*b* is turned on or turned off, and finally, the mark 27*c* is turned on or off.

In this case, since the departure notification display 27 is rendered as if the mark 27*a* gradually advances to positions of the mark 27*b* and the mark 27*c* along a traveling direction of the vehicle, a pedestrian or the like who sees the departure notification display 27 can recognize a departure direction of the vehicle simply by confirming the departure notification display 27 is displayed in which direction of the vehicle C. When a pedestrian or the like sees the departure notification display 27 as if the mark 27*a* advances to the positions of the mark 27*b* and the mark 27*c*, the pedestrian or the like can recognize a departure direction of the vehicle.

The brake sensor 7 of the vehicle departure notification display system 33 shown in FIG. 1 functions as a brake detection unit that detects switching information between ON (braking state) and OFF (releasing state) of a foot brake of the vehicle C. A brake detected by the brake sensor 7 is not limited to a foot brake, and may be a hand brake or an automatic brake that is automatically controlled by a system of an automatic driving vehicle and does not involve an operation from a driver as long as the brake is used to stop a vehicle in traveling based on a closing degree and then the brake is released at a predetermined opening degree. The brake sensor 7 detects releasing of the foot brake of the vehicle C that was in a braking state, and outputs the switching information to the control unit 5.

The start switch sensor 8 in FIG. 1 functions as a brake detection unit that detects switching information between OFF and ON of a start switch (an ignition switch, a keyless system start switch, and the like) of the vehicle C. The start switch sensor 8 detects switching information indicating that the start switch is switched from OFF to ON, and outputs the switching information to the control unit 5.

The shift sensor 9 is a shift detection unit that detects information indicating whether a shift lever of the vehicle C is at forward (D position: drive), reverse (R position: reverse), parking (P position), or the like. When the shift lever is at the "drive" position, the shift sensor 9 detects information related to a forward movement of the vehicle C and outputs the information to the control unit 5. When the shift lever is at the "reverse" position, the shift sensor 9 detects information related to a reverse movement of the vehicle C and outputs the information to the control unit 5.

The steering angle sensor 10 functions as a steering detection unit that detects information related to any one of straight traveling, a right steering, and a left steering of the vehicle C. For example, when a steering device (steering wheel or the like, not shown) during straight traveling of the vehicle C is steered in a right turn direction from a steering angle of 0°, a steering angle is set as a plus angle, and when the steering device is steered in a left turn direction, a steering angle is set as a minus angle. The steering angle sensor 10 detects the plus steering angle as information related to a right steering of the vehicle C, or detects the minus steering angle as information related to a left steering of the vehicle C, and outputs the information to the control unit 5.

The speed sensor 11 functions as a temporary stop detection unit that detects information related to a temporary stop of the vehicle based on a speed change of the vehicle, and outputs the information to the control unit 5. Specifically, the speed sensor 11 detects a speed of the vehicle at regular time intervals. When the speed sensor 11 detects information indicating that a vehicle speed is zero after either information related to a positive vehicle speed (forward) or information related to a negative vehicle speed (reverse) is detected, the speed sensor 11 detects information related to a temporary stop of the vehicle and outputs the information to the control unit 5. The speed sensor 11 can also be used in a departure notification display stop determination executed by the control unit 5.

The car navigation system 12 functions as a necessary target detection unit that detects a necessary target for a vehicle departure notification display or an unnecessary target detection unit that detects an unnecessary target for a vehicle departure notification display based on road information that is stored in the car navigation system 12 or is transmitted via a communication line and position information of the own vehicle obtained by a satellite positioning system such as a global navigation satellite system (GNSS) and a global positioning system (GPS, registered trademark). The car navigation system 12 detects a necessary target or an unnecessary target for a vehicle departure notification display, and outputs information related to the necessary target or the unnecessary target to the control unit 5.

The necessary target for a vehicle departure notification display detected by the car navigation system 12 is whether there is an obligation to temporarily stop the vehicle C at intersecting roads where the vehicle C arrived, a T-shaped road, and an entrance to a priority road (from a narrow road to a wide road) at an intersection. On the other hand, the unnecessary target for a vehicle departure notification display is a "traffic jam" where the vehicle C arrived, an expressway toll station, a railroad crossing, and the like.

As shown in FIG. 1, the imaging unit 13 includes an in-vehicle camera 13*a*, the road monitoring camera 13*b*, and an image processing device 13*c*. The imaging unit 13 functions as the necessary target detection unit that detects a necessary target for a vehicle departure notification display or the unnecessary target detection unit that detects an unnecessary target for the vehicle departure notification display, based on an image obtained by imaging surroundings of the vehicle C.

The in-vehicle camera 13*a* may be incorporated in the vehicle head lamps 1 so that front surroundings of the vehicle C can be imaged as shown in FIG. 2. The in-vehicle camera 13*a* may be mounted at a position where a top surface of a ceiling of a vehicle body, a hood, a door mirror, and the like or surroundings of the vehicle C can be imaged, or may be mounted on the rear combination lamps 4 so that rear surroundings of the vehicle C can be imaged. The in-vehicle camera 13*a* images surroundings of the vehicle C on which the in-vehicle camera 13*a* is mounted. The road monitoring camera 13*b* may be installed on a road. The road monitoring camera 13*b* images surroundings of the vehicle C coming close to the road monitoring camera 13*b*. The image processing device 13*c* may be mounted on the vehicle C. The image processing device 13*c* detects a necessary target or an unnecessary target for a vehicle departure notification display by analyzing an image captured by the in-vehicle camera 13*a* or an image that is captured by the road monitoring camera 13*b* and transmitted to the image processing device 13*c* via a communication line, and the imaging processing device 13*c* outputs the necessary target or the unnecessary target for a vehicle departure notification display to the control unit 5.

The necessary target for a vehicle departure notification display detected by the imaging unit 13 is a sign indicating an obligation to temporarily stop the vehicle C at intersecting roads, a T-shaped road, an entrance to a priority road (from a narrow road to a wide road) at an intersection, a pedestrian waiting to cross a road, and the like that are imaged by the in-vehicle camera 13*a* at a position where the vehicle C arrived. In addition, the necessary target for a vehicle departure notification display detected by the imaging unit 13 is a road with a sign indicating an obligation to temporarily stop the vehicle C, a T-shaped road, an entrance to a priority road (from a narrow road to a wide road) at an intersection, a pedestrian waiting to cross a road, and the like that are imaged by the road monitoring camera 13*b*. On the other hand, the unnecessary target for a vehicle departure notification display detected by the imaging unit 13 is a "traffic jam", an expressway toll station, a railroad crossing, and the like that are imaged by the in-vehicle camera 13*a*, or a "traffic jam", an "expressway toll station", a "railroad crossing", and the like that are imaged by the road monitoring camera 13*b*.

In addition to the imaging unit 13 that detects an image, the necessary target detection unit and the unnecessary target detection unit may include a radar sensor using a millimeter wave radar, a laser imaging detection and ranging (LiDAR), ultrasonic waves, and the like.

The road information communication system 130 functions as the unnecessary target detection unit (a stop signal detection unit when a stop signal is detected) that detects traffic jam information at a current position of the own vehicle linked with position information of the vehicle C obtained by the satellite positioning system of the car navigation system 12 and stop signal (red light signal) information of traffic lights at an intersection where the own vehicle is about to arrive, as an unnecessary target for a departure notification display. The road information communication system 130 is vehicle information and communication system (VICS, registered trademark) or the like. The road information communication system 130 detects information related to a traffic jam or a stop signal (red light signal) that is an unnecessary target, and outputs the information to the control unit 5.

The radar sensor 14 is a microwave radar sensor, a millimeter wave radar sensor, or the like. The radar sensor 14 functions as a preceding vehicle detection unit that detects a preceding vehicle of the own vehicle as an unnecessary target for the vehicle departure notification display. The radar sensor 14 detects information related to the preceding vehicle, and outputs the information to the control unit 5.

The automatic toll collection terminal 15 is an in-vehicle device such as an electronic toll collection system (ETC, registered trademark) that automatically pays a toll when the own vehicle passes through an automatic toll collection device 32 (see FIG. 8) installed at an expressway toll station or the like. The automatic toll collection terminal 15 wirelessly communicates with the automatic toll collection device (not shown) installed at the toll station. The automatic toll collection terminal 15 functions as an automatic toll collection device detection unit that detects a fact that the own vehicle passes through the automatic toll collection device 32 as an unnecessary target for a vehicle departure notification display, and outputs information indicating that the own vehicle passed through the automatic toll collection device to the control unit 5.

The turn signal lamp sensor 16 functions as a turn signal lamp detection unit that detects switching information indicating that a turn signal lamp is switched from OFF to ON as an unnecessary target for a vehicle departure notification display, and outputs the switching information indicating that the turn signal lamp is switched from OFF to ON to the control unit 5.

Figure 5:
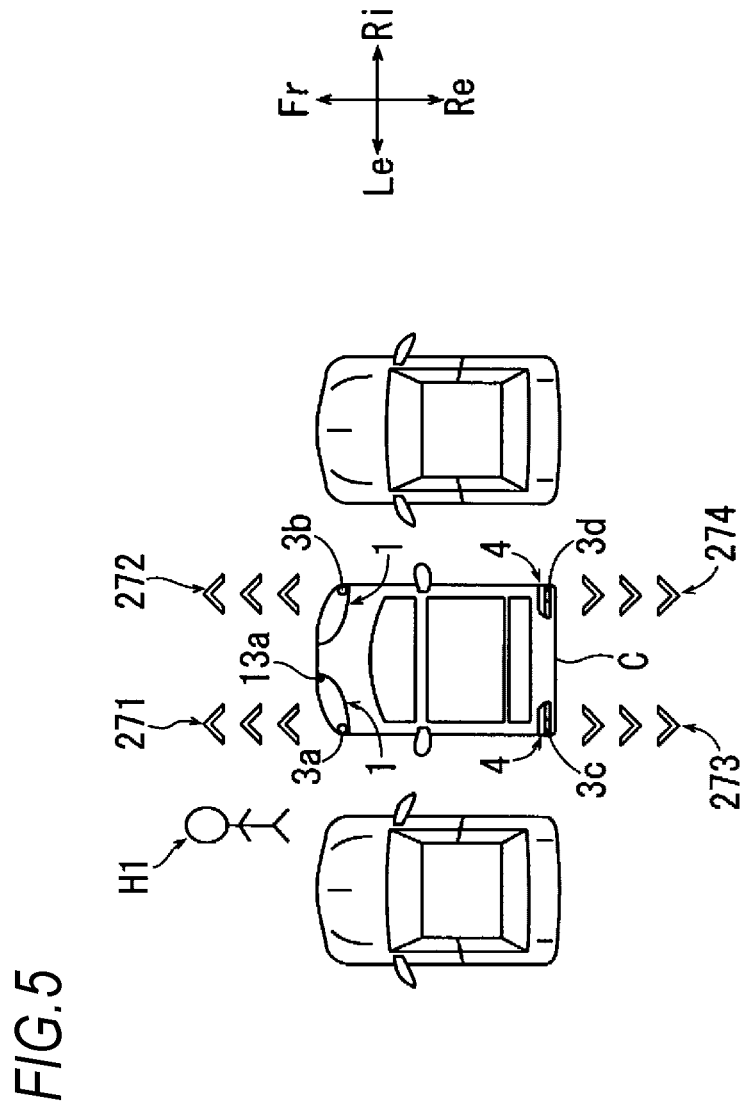
FIG. 5 is a view showing a state of rendering, onto a road surface, a departure notification display from a vehicle that departs forward or rearward from a parking state according to a first embodiment.

Next, a departure notification display for the vehicle C that departs forward or rearward from a parking state according to a first embodiment will be described with reference to FIG. 5. In FIGS. 5 to 8, of the departure notification display device 3 that is mounted on the left and right vehicle head lamps 1 and renders a departure notification display onto a road surface ahead of the vehicle, a departure notification display device 3*a* indicates a left front side departure notification display device 3 and a departure notification display device 3*b* indicates a right front side departure notification display device 3. Departure notification displays rendered by the left and right front side departure notification display devices 3*a* and 3*b* are denoted by 271 (left front side) and 272 (right front side). Of the departure notification display device 3 that is mounted on the left and right rear combination lamps 4 and renders a departure notification display onto a road surface at a rear side of the vehicle, a departure notification display device 3c indicates a left rear side departure notification display device 3 and a departure notification display device 3d indicates a right rear side departure notification display device 3. Departure notification displays rendered by the left and right rear side departure notification display devices 3c and 3d are denoted by 273 (left rear side) and 274 (right rear side).

First, a driver of the vehicle C in FIG. 5 turns on a start switch or the like of the vehicle C in a braking state (an ON state of a brake) in which a foot brake pedal is stepped on. Next, the driver shifts a shift lever of the vehicle C to forward (drive) or reverse, and releases the foot brake that was stepped on (an OFF state of the brake).

The start switch sensor 8 detects switching information indicating that the start switch is switched from OFF to ON, and outputs the switching information to the control unit 5. Subsequently, the brake sensor 7 detects switching information indicating that the brake is switched from ON (braking) to OFF (releasing), and outputs the switching information to the control unit 5. The control unit 5 executes a necessity determination for determining whether a departure notification display is necessary based on the switching information described above. Further, the control unit 5 determines a traveling direction of the vehicle based on information related to a position of the shift lever detected by the shift sensor 9, and determines a display direction of a departure notification display.

Specifically, for the vehicle C in FIG. 5, when the driver turns on the start switch and releases the brake pedal that was stepped on in a state in which the shift lever is at the drive position, the control unit 5 controls the road surface rendering unit 6 to render the departure notification displays 271 and 272 onto a road surface ahead of the vehicle. In this manner, the driver of the vehicle C calls attention of a pedestrian H1 or the like who wants to cross a front side of the vehicle C that "the vehicle C in park is about to depart forward from now on". When the shift lever is at the reverse position, the control unit 5 controls the road surface rendering unit 6 to render the departure notification displays 273 and 274 onto a road surface at the rear side of the vehicle C in a releasing state of the brake pedal. In this manner, the driver of the vehicle C calls attention of a pedestrian or the like (not shown) who wants to cross a rear side of the vehicle C that "the vehicle C in park is about to reverse from now on". Accordingly, a pedestrian or the like can accurately know departure timing of the vehicle C. In the necessity determination for the departure notification display as described above, ON and OFF switching of the start switch may not be included in a determination condition. In this case, a departure notification display is rendered even when the vehicle is temporarily stopped under a situation in which the departure notification display is unnecessary (signal waiting or the like). Therefore, it is desirable to restrict the departure notification display by limiting a necessity determination condition.

The control unit 5 of the departure notification display device 3 controls the road surface rendering unit 6 again to stop rendering a departure notification display onto a road surface when the speed sensor 11 detects information indicating the vehicle speed of the vehicle C that is detected at regular time intervals is accelerated from zero to a predetermined speed or more (for example, the speed is 5 Km/h or more. The speed is not limited thereto.), when a total distance meter or the like (not shown) provided in the vehicle C detects information indicating that the vehicle C travels for a predetermined distance since the vehicle C starts to travel (for example, the vehicle C travels for 10 m since the vehicle C starts to travel. The distance is not limited thereto.), when a timer (not shown) provided in the vehicle C detects information indicating that the vehicle C travels for a predetermined period of time since the vehicle starts to travel (for example, the vehicle C travels for 10 seconds since the vehicle C starts to travel. The period of time is not limited thereto), or when the steering angle sensor 10 or the turn signal lamp sensor 16 detects information indicating that a left steering or a right steering of the vehicle C is completed (that is, when the steering angle sensor 10 detects information indicating that a detected angle of the steering device is returned to an angle of zero from either a plus angle or a minus angle, or when the turn signal lamp sensor 16 detects information indicating that a turn signal switch is switched from ON to OFF).

When the imaging unit 13 detects a pedestrian or another vehicle in the surroundings of the vehicle C, it is desirable that the control unit 5 controls the road surface rendering unit 6 so as to render a departure notification display for a long period of time by changing the predetermined values described above (for example, changing a speed related to a stop from 5 Km/h or more to 10 Km/h or more, changing a distance from 10 m to 15 m, changing a period time from 10 seconds to 15 seconds, and the like) in order to call sufficient attention of the detected pedestrian or the like that the vehicle is about to depart. It is desirable that the control unit 5 executes the same control in the second embodiment to the fifth embodiment to be described later.

Since the departure notification display device 3 of the vehicle C determines that a condition in which the start switch is switched to ON before the brake pedal is switched to a releasing state is a determination condition necessary for a departure notification display, an unnecessary departure notification display is not displayed when a departure notification display is unnecessary, such as when the vehicle departs from a temporary stop due to a red light signal or a railroad crossing in the first embodiment.

According to the vehicle departure notification display device 3 having the configuration described above, since a departure notification display is displayed only immediately before departure of a vehicle, a pedestrian or the like can recognize the departure notification display and can accurately know departure timing of the vehicle C.

According to the vehicle departure notification display device 3 having the configuration described above, a departure notification display is displayed immediately before departure of a parked vehicle, but is not displayed immediately before departure of a vehicle when the vehicle departs from a temporary stop state. Therefore, there is no need to render an unnecessary departure notification display for departure from a traffic jam, departure from signal waiting, and departure from a temporary stop in which it is unnecessary to notify a pedestrian or the like of departure of a vehicle.

According to the vehicle departure notification display device 3 having the configuration described above, a departure notification display is rendered onto a road surface ahead of the vehicle C when the parked vehicle moves forward. On the other hand, a departure notification display is rendered onto a road surface at a rear side of the vehicle C when the parked vehicle reverses. In this manner, a pedestrian or the like can accurately know a departure direction of the vehicle C.

Next, a departure notification display for the vehicle C that departs obliquely forward from a parallel parking state according to a second embodiment will be described with reference to FIG. 6A. A driver of the vehicle C in FIG. 6A turns on a start switch or the like of the vehicle C in a braking state (an ON state of a brake) in which a foot brake pedal is stepped on. Next, the driver shifts a shift lever of the vehicle C to forward (drive), steers a steering wheel (a steering device (not shown)) to the left or the right, and releases the foot brake that was stepped on (an OFF state of the brake).

The start switch sensor 8 detects switching information indicating that the start switch is switched from OFF to ON, and outputs the switching information to the control unit 5. Subsequently, the brake sensor 7 detects switching information indicating that the brake is switched from ON (braking) to OFF (releasing), and outputs the switching information to the control unit 5. The control unit 5 executes a necessity determination for determining whether a departure notification display is necessary based on the switching information described above. Further, the shift sensor 9 detects information indicating that the shift lever is at the drive position (forward), and outputs the information to the control unit 5. The steering angle sensor 10 detects information related to a left or right steering direction of the vehicle, and outputs the information to the control unit 5. The control unit 5 determines a display direction of the departure notification display based on the information described above.

Specifically, for the vehicle C in FIG. 6, when the driver turns on the start switch, shifts the shift lever to the drive position, and releases the brake pedal that was stepped on in a state in which the steering wheel is steered to the right, the control unit 5 of the departure notification display device 3b controls the road surface rendering unit 6 to render the departure notification display 272 onto a road surface ahead of the vehicle obliquely to the right. In this manner, the driver of the vehicle C calls attention of a pedestrian H2 or the like who wants to pass through a right side of the vehicle C in parallel parking that "the vehicle C in parallel parking is about to depart to a right front side from now on" in a country where a vehicle travels at a left side. When the driver of the vehicle C releases the brake pedal that was stepped on in a state in which the steering wheel is steered to the left, the control unit 5 of the departure notification display device 3a controls the road surface rendering unit 6 to render the departure notification display 271 on a road surface ahead of the vehicle C obliquely to the left. In this manner, the driver of the vehicle C calls attention of a pedestrian H3 or the like who wants to pass through a left side of the vehicle C in parallel parking that "the vehicle C in parallel parking is about to depart to a left front side from now on" in a country where a vehicle travels at a right side. The departure notification displays 271 and 272 displayed at a front side obliquely to the left and a front side obliquely to the right may be displayed in a lateral direction to the left or the right instead of an oblique direction when a vehicle in parallel parking departs to a directly lateral side in future automatic driving or the like.

Figure 6A:
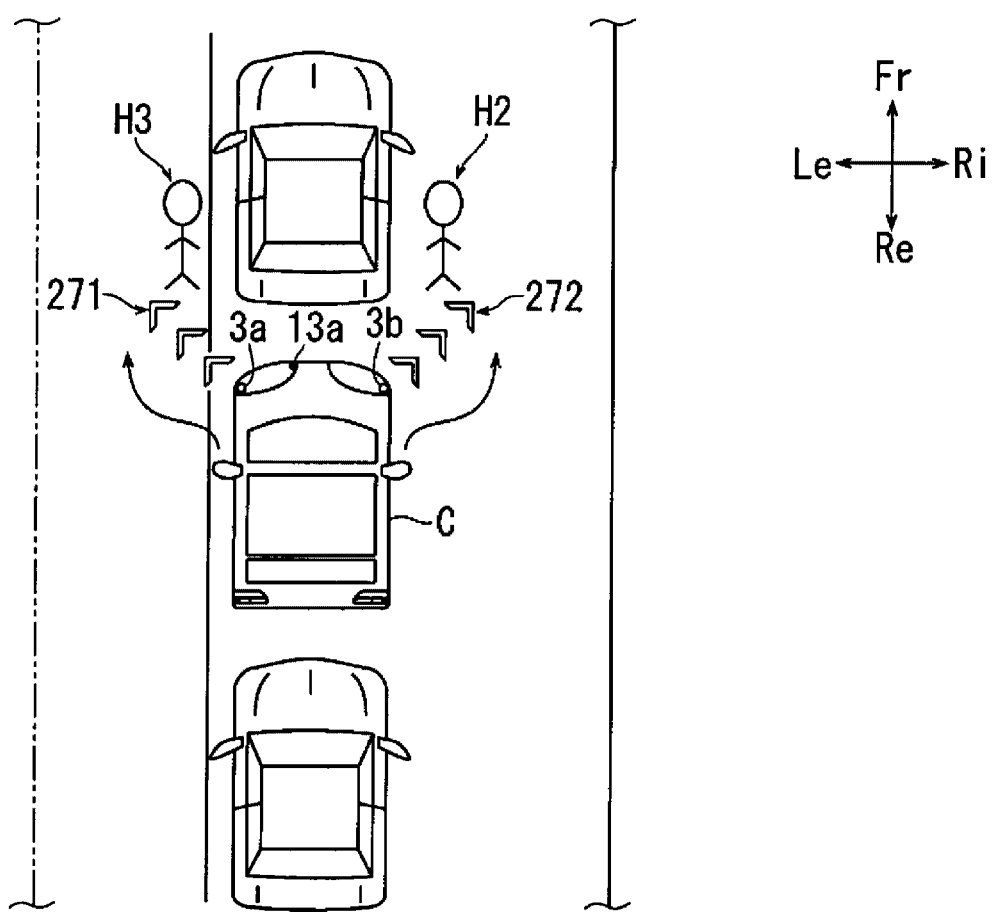
FIG. 6A is a view showing a state of rendering, onto a road surface, a departure notification display from a vehicle that departs forward obliquely to the left or the right from a parallel parking state according to a second embodiment.

According to the second embodiment in FIG. 6A, since steering wheels of a vehicle in the related art are front wheels in most cases, when the shift lever is at the drive position (forward), the vehicle departure notification displays 271 and 272 are rendered at a front side obliquely to the right or at a front side obliquely to the left corresponding to a steering direction. However, when steering wheels are rear wheels in a future automatic driving technique, the vehicle C may depart to an obliquely rear side. In this case, the vehicle departure notification display devices 3 provided in the rear combination lamps 4 cause the road surface rendering unit 17 to swing, and the road surface rendering unit 6 may display the departure notification displays 273 and 274 (see FIG. 5) at a rear side obliquely to the left or at a rear side obliquely to the right corresponding to a left or right steering direction of rear wheels.

According to the vehicle departure notification display device 3 having the configuration described above, when a parked vehicle departs from a parallel parking state or the like to a left or right direction, a pedestrian or the like can accurately know a left or right direction in which the vehicle C departs.

Figure 6B:
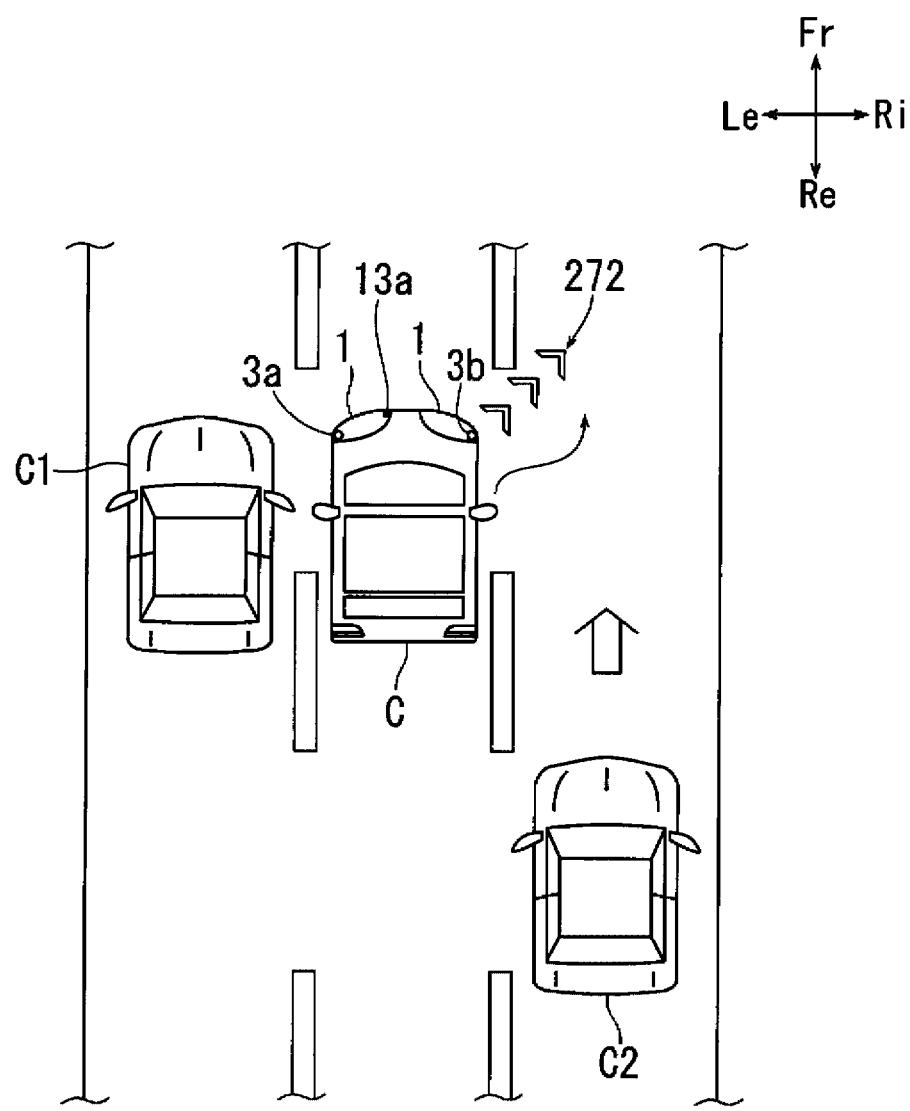
FIG. 6B is a view showing a state of rendering, onto a road surface, a departure notification display from a vehicle that departs to an obliquely front side from a state in which the vehicle is laterally parked adjacent to another vehicle according to a third embodiment.

Next, a departure notification display for the vehicle C that departs to an obliquely front side from a state in which the vehicle C is temporarily parked at a lateral side of another vehicle C1 according to a third embodiment will be described with reference to FIG. 6B. First, the speed sensor 11 detects information indicating that a vehicle speed of the own vehicle is decelerated to zero from a positive speed by a foot brake operation from the driver, and outputs the information to the control unit 5. The control unit 5 recognizes a temporary stop of the vehicle C based on the information. After the vehicle C is temporarily stopped, when the driver releases the foot brake that was stepped on after a predetermined period of time (for example, after one minute since the vehicle C is temporarily stopped. The period of time is not limited thereto), the brake sensor 7 detects information indicating that the foot brake is released. The steering angle sensor 10 detects information indicating that the steering wheel is steered to a right side (or a left steering), and outputs the information to the control unit 5. Based on the information, the control unit 5 controls the road surface rendering unit 6 of the departure notification display device 3b (the departure notification display device 3a in case of a left steering) to render the departure notification display 272 onto a road surface ahead of the vehicle C obliquely to the right (render the departure notification display 271 onto a road surface ahead of the vehicle C obliquely to the left in case of a left steering). In this manner, the driver of the vehicle C calls attention of the traveling vehicle C1 that is about to pass through a side of the vehicle C that "the vehicle C in lateral parking is about to depart to a right front side (or left front side) from now on and travel onto a traveling line of the vehicle C1". The control unit 5 executes an unnecessary determination for a departure notification display for determining whether information related to ON and OFF of the foot brake detected after a predetermined period of time since the vehicle C is temporarily stopped is information detected based on a temporarily stop in which a departure notification display is unnecessary, such as signal waiting. When the control unit 5 determines that the departure notification display is unnecessary, the control unit 5 controls the road surface rendering unit 6 not to render a departure notification display.

According to the vehicle departure notification display device 3 having the configuration described above, a pedestrian or the like can accurately know departure time of a temporarily stopped vehicle when the vehicle departs from a lateral parking. On the other hand, when a vehicle is temporarily stopped for a short period of time and then departs, such as when the vehicle departs from signal waiting, there is no need to let a pedestrian or the like know departure of the vehicle, and there is no need to render an unnecessary departure notification display.

Next, a departure notification display displayed in a case in which a necessary target for a departure notification display is detected by the car navigation system 12 or the imaging unit 13 when the vehicle C is temporarily stopped according to a fourth embodiment will be described with reference to FIG. 7. First, the car navigation system 12 or the imaging unit 13 detects whether there is an obligation to temporarily stop the vehicle C at intersecting roads where the vehicle C arrived (detected by the car navigation system 12 only), a temporary stop obligation sign 28 installed at intersecting roads where the vehicle C arrived or a temporary stop mark (not shown) on a road surface (detected by the imaging unit 13 only), a T-shaped road with no traffic lights where the vehicle C arrived, an entrance (entrance to a wide road from a narrow road) to a priority road at intersecting roads where the vehicle C arrived, a pedestrian H4 waiting to cross a road and a vehicle C3 that is about to pass through intersecting roads (detected by the imaging unit 13 only), and the like. The car navigation system 12 or the imaging unit 13 outputs the detected information to the control unit 5. Next, the brake sensor 7 detects switching information from a temporary stop in which the driver steps on the foot brake (an ON state of the brake) to releasing of the foot brake (an OFF state of the brake), and outputs the switching information to the control unit 5. The control unit 5 executes a necessity determination for a departure notification display based on the information output from the car navigation system 12 or the imaging unit 13 and the switching information output from the brake sensor 7.

Figure 7:
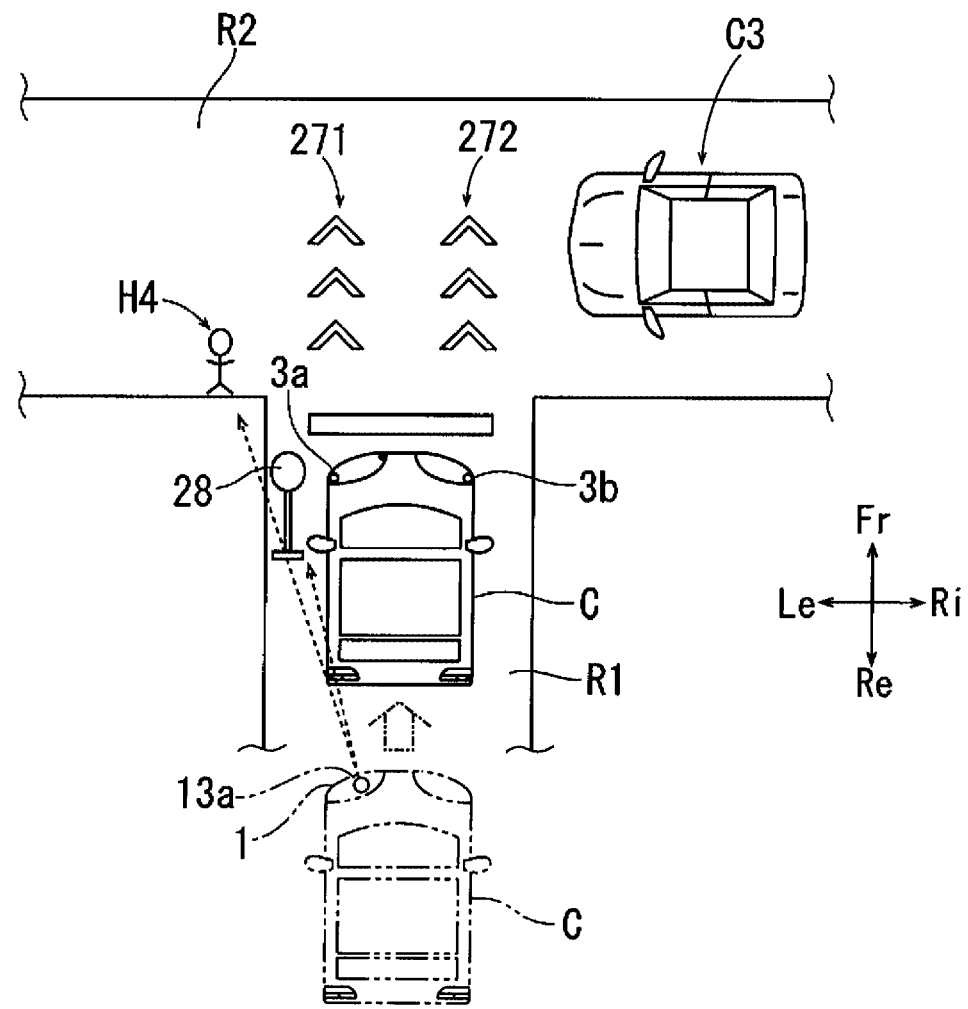
FIG. 7 is a view showing a state of rendering, onto a road surface, a departure notification display when detecting a necessary target for the departure notification display during a temporary stop according to a fourth embodiment.

As shown in FIG. 7, based on the necessity determination, the control unit 5 controls the road surface rendering unit 6 of the departure notification display devices 3a and 3b to render the departure notification displays 271 and 272 onto a road surface of a road R2 that is located ahead of the vehicle C and intersects a road R1 on which the own vehicle travels. In this manner, on the intersecting roads such as a T-shaped road in FIG. 7, the driver of the vehicle C calls attention of the pedestrian H4 who is about to cross the road R1 and pass through a front side of the vehicle C, the vehicle C3 that travels on the road intersecting the road R1, or the like that "the temporarily stopped vehicle C is about to enter the ahead road intersecting the road R1 from now on". The departure notification displays 271 and 272 are not displayed until the driver of the vehicle C releases the brake pedal that was stepped on. Therefore, when the driver of the vehicle C waits for the pedestrian H4 waiting to cross the road 1 and the pedestrian H4 walks on the road 1 but does not pass through a front side of the vehicle C yet, the pedestrian H4 can accurately know that the vehicle does not start moving based on a fact that the departure notification display is not rendered. As a result, the pedestrian H4 can cross the road and pass through the front side of the vehicle C at ease.

In the first to fourth embodiments shown in FIGS. 5, 6A, 6B, and 7, the in-vehicle camera 13a detects the pedestrians H1 to H4 or the vehicles C2 and C3 that are present in a vehicle traveling direction before the driver releases the foot brake that was stepped on, the control unit 5 executes the necessity determination and displays the departure notification display in the traveling direction of the vehicle C. When a pedestrian, a vehicle, or the like is not detected, the control unit 5 may execute an unnecessary determination for a departure notification display and control the road surface rendering unit 6 not to render a departure notification display.

According to the vehicle departure notification display device 3 having the configuration described above, when the departure notification display device 3 detects a temporary stop sign, a T-shaped road, a pedestrian waiting to cross a road, and the like as a necessary target for a departure notification display, since the departure notification display is displayed at the time when the vehicle departs from a temporary stop, the pedestrian or the like can accurately know departure timing of the vehicle.

Next, a case in which a departure notification display is not displayed based on a fact that an unnecessary target is detected when the vehicle C is temporarily stopped according to a fifth embodiment will be described with reference to FIG. 8. The car navigation system 12, the imaging unit 13, the radar sensor 14, the automatic toll collection terminal 15, and the turn signal lamp sensor 16 shown in FIG. 1 function as an unnecessary target detection unit that detects an unnecessary target for a departure notification display.

Figure 8:
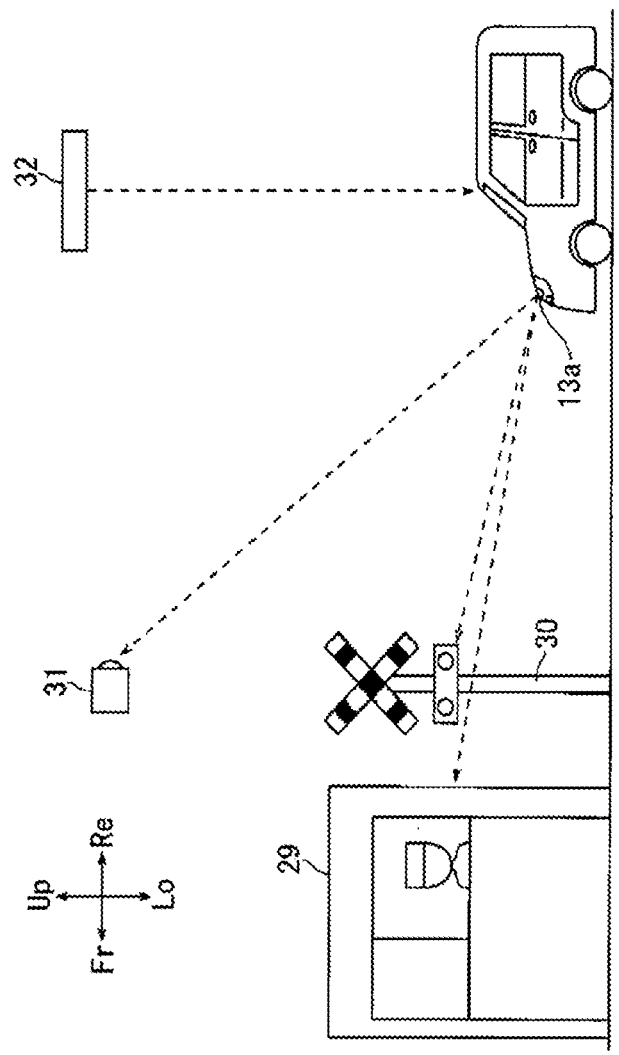
FIG. 8 is a view showing a state of not rendering, onto a road surface, a departure notification display when detecting signal waiting or the like as an unnecessary target for a notification display during a temporary stop according to a fifth embodiment.

The unnecessary target for a departure notification display is a traffic jam (not shown) detected at a position where the vehicle C arrived, an expressway toll station 29 and a railroad crossing 30 shown in FIG. 8, that are detected by the car navigation system 12. Further, the unnecessary target for a departure notification display is the expressway toll station 29, the railroad crossing 30, and a stop signal (red light signal) 31 that are detected based on an image obtained by the in-vehicle camera 13a of the imaging unit 13 imaging a position where the vehicle C arrived. The unnecessary target for a departure notification display may be a traffic jam or the stop signal (red light signal) 31 detected by a road information communication system at a position where the vehicle C arrived. Further, the unnecessary target for a departure notification display may be a preceding vehicle (not shown) that travels ahead of the vehicle C and is detected by the radar sensor 14, the automatic toll collection device 32 detected by the automatic toll collection terminal 15 at an expressway toll station or the like where the vehicle C arrived, waiting for a right turn or a left turn detected by the turn signal lamp sensor 16.

After the unnecessary target is detected by the unnecessary target detection unit, when the brake sensor 7 detects switching information from a temporary stop in which the driver steps on a foot brake (an ON state of the brake) to releasing of the foot brake (an OFF state of the brake), the control unit 5 executes an unnecessary determination for a departure notification display based on the switching information output from the brake sensor 7. Even when the vehicle is temporarily stopped by the driver stepping on the foot brake and then the foot brake is released, the control unit 5 controls the road surface rendering unit 6 not to render a departure notification display based on a fact that the unnecessary target detection unit detects an unnecessary target for a departure notification display. Therefore, the departure notification display device 3 does not need to display an unnecessary departure notification display when the vehicle departs from a temporary stop due to signal waiting and the like, and when a pedestrian, another vehicle, or the like in the traveling direction can easily know departure timing of the vehicle C even if a departure notification display is not rendered onto a road surface.

According to the vehicle departure notification display device 3 having the configuration described above, the departure notification display device 3 does not need to display an unnecessary departure notification display when an unnecessary target for a departure notification display, such as signal waiting, a traffic jam, passing through an expressway toll station or an automatic toll collection device, a railroad crossing, and waiting for a left or right turn at an intersection, is detected.

Next, a departure notification display device 3A according to a modification will be described with reference to FIG. 9. FIG. 9 is a block diagram showing the departure notification display device 3A according to a modification. As shown in FIG. 9, the departure notification display device 3A mounted on the vehicle C includes the control unit 5, the road surface rendering unit 6, the brake sensor 7, the start switch sensor 8, the shift sensor 9, the steering angle sensor 10, the speed sensor 11, the car navigation system 12, the imaging unit 13A, the radar sensor 14, the automatic toll collection terminal 15, the turn signal lamp sensor 16, and the road information communication system 130.

The imaging unit 13A includes the in-vehicle camera 13*a* and the image processing device 13*c* and does not include the road monitoring camera 13*b*. The imaging unit 13A is different from the imaging unit 13 in terms of this point. The road monitoring camera 13*b* is installed outside the vehicle C.

A vehicle to which the departure notification display device 3A according to the modification is applied also has effects the same as the vehicle C to which the departure notification display system 33 is applied as described above. That is, the above-described effects can be achieved by the departure notification display device 3A.

This application is based on Japanese Patent Application No. 2018-184491 filed on Sep. 28, 2018 and Japanese Patent Application No. 2019-166526 filed on Sep. 12, 2019, the contents of which are incorporated herein by reference.

The invention claimed is:

1. A vehicle departure notification display device comprising:
   a road surface rendering unit mounted on a vehicle and configured to render a departure notification display having a predetermined shape onto a road surface in a traveling direction of the vehicle by light; and
   a control unit configured to determine whether a departure notification display is necessary in departure of the vehicle and configured to control the road surface rendering unit to render a departure notification display in a necessity determination and control the road surface rendering unit again to stop a departure notification display in a notification stop determination for the rendered departure notification display,
   wherein the control unit regards detection of switching information indicating that a brake of the vehicle is switched from ON to OFF as the necessity determination for the departure notification display and controls the road surface rendering unit to render a departure notification display, and
   wherein the control unit regards the detection of the switching information indicating that the brake is switched from ON to OFF after detection of an unnecessary target detected by an unnecessary target detection unit configured to detect an unnecessary target for a departure notification display as an unnecessary determination for a departure notification display and controls the road surface rendering unit not to render a departure notification display based on the detection of the unnecessary target.

2. The vehicle departure notification display device according to claim 1,
   wherein the control unit regards the detection of the switching information indicating that the brake is switched from ON to OFF after detection of switching information indicating that the start switch of the vehicle is switched from OFF to ON as the necessity determination and controls the road surface rendering unit to render a departure notification display.

3. The vehicle departure notification display device according to claim 1,
   wherein the control unit is configured to control the road surface rendering unit to render the departure notification display in a front direction of the vehicle when information related to a forward movement of the vehicle is detected and control the road surface rendering unit to render the departure notification display in a rear direction of the vehicle when information related to a reverse movement of the vehicle is detected.

4. The vehicle departure notification display device according to claim 1,
   wherein the control unit is configured to control the road surface rendering unit to render a departure notification display in a right direction of the vehicle when information related to a right steering of the vehicle is detected and control the road surface rendering unit to render a departure notification display in a left direction of the vehicle when information related to a left steering of the vehicle is detected.

5. The vehicle departure notification display device according to claim 1,
   wherein the control unit regards detection of information related to a temporary stop of the vehicle and detection of switching information indicating that the brake is switched from ON to OFF after a period of non-notification determination from the detection of the information related to the temporary stop as the necessity determination for a departure notification display and controls the road surface rendering unit to render a departure notification display.

6. The vehicle departure notification display device according to claim 1,
   wherein the control unit regards the detection of the switching information indicating that the brake is switched from ON to OFF after detection of a necessary target detected by a detection unit configured to detect the necessary target for a departure notification display as the necessity determination for a departure notification display and controls the road surface rendering unit to render a departure notification display.

7. The vehicle departure notification display device according to claim 6,
   wherein the necessary target detection unit is a car navigation system, and the necessary target is detected based on road information obtained by the car navigation system.

8. The vehicle departure notification display device according to claim 6,
   wherein the necessary target detection unit is an imaging unit that images surroundings of the vehicle, and the necessary target is detected based on an image captured by the imaging unit.

9. The vehicle departure notification display device according to claim 1,
   wherein the unnecessary target detection unit is a car navigation system, and the unnecessary target is detected based on road information obtained by the car navigation system.

10. The vehicle departure notification display device according to claim 1,
    wherein the unnecessary target detection unit is an imaging unit that images surroundings of the vehicle, and the unnecessary target is detected based on an image captured by the imaging unit.

11. The vehicle departure notification display device according to claim 1,
    wherein the unnecessary target detection unit is a stop signal detection unit that detects a stop signal of the vehicle as the unnecessary target.

12. The vehicle departure notification display device according to claim 1,
wherein the unnecessary target detection unit is a preceding vehicle detection unit that detects a preceding vehicle of the vehicle as the unnecessary target.

13. The vehicle departure notification display device according to claim 1,
wherein the unnecessary target detection unit is an automatic toll collection device detection unit that detects a fact that the vehicle passes through an automatic toll collection device as the unnecessary target.

14. The vehicle departure notification display device according to claim 1,
wherein the unnecessary target detection unit is a turn signal lamp detection unit that detects ON and OFF of a turn signal lamp of the vehicle as the unnecessary target.

15. A vehicle departure notification display device comprising:
a road surface rendering unit mounted on a vehicle and configured to render a departure notification display having a predetermined shape onto a road surface in a traveling direction of the vehicle by light; and
a control unit configured to determine whether a departure notification display is necessary in departure of the vehicle and configured to control the road surface rendering unit to render a departure notification display in a necessity determination and control the road surface rendering unit again to stop a departure notification display in a notification stop determination for the rendered departure notification display,
wherein the control unit regards detection of switching information indicating that a brake of the vehicle is switched from ON to OFF as the necessity determination for the departure notification display and controls the road surface rendering unit to render a departure notification display,
wherein the control unit regards detection of information related to a temporary stop of the vehicle and detection of switching information indicating that the brake is switched from ON to OFF after a period of non-notification determination from the detection of the information related to the temporary stop as the necessity determination for a departure notification display and controls the road surface rendering unit to render a departure notification display,
wherein the control unit controls the road surface rendering unit not to render a departure notification display based on the detection of the switching information on the brake before the period of non-notification determination elapses.

\* \* \* \* \*